Patented Feb. 25, 1941

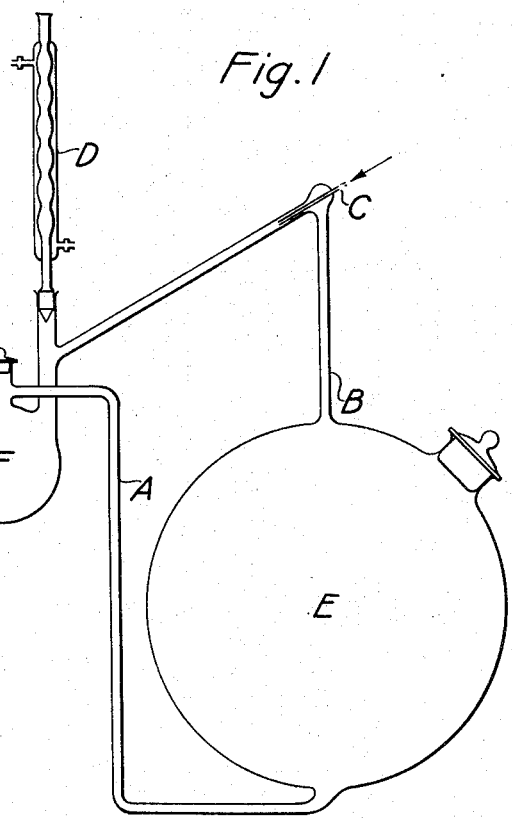
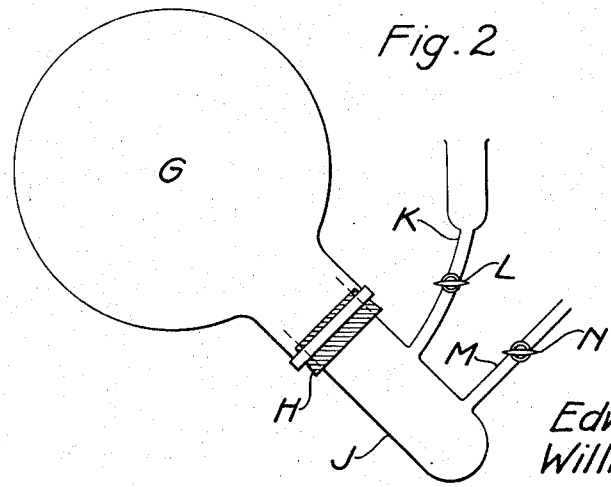
Edward C. Yackel
William O. Kenyon
INVENTORS

2,232,990

UNITED STATES PATENT OFFICE 2,232,990

PREPARATION OF OXYCELLULOSE

Edward C. Yackel and William O. Kenyon, Rochester, N. Y., assignors to Eastman Kodak Company, Rochester, N. Y., a corporation of New Jersey Application July 15, 1938, Serial No. 219,464

5 Claims. (Cl. 260—212)

This invention relates to the oxidation of the terminal carbon atom of the glucose unit of cellulose by $NO_2$ under controlled conditions and the undegraded, alkali-soluble cellulose prepared thereby.

The oxidation of cellulose has allegedly been carried out by previous investigators but in no case, to our knowledge, has the oxidation directed itself to the terminal carbon atom of the glucose units of the cellulose, nor has it resulted in an undegraded alkali-soluble cellulose. Various oxidizing agents, such as chlorine, ozone, chromic acid, chlorates, nitric acid, etc., have been previously employed for treating cellulose to obtain an oxycellulose, but usually the cellulose has been broken down or degraded. In no instance has a homogeneous, alkali-soluble, undegraded cellulose been obtained.

Cellulose has previously been treated with $NO_2$ but under the severe conditions used, the cellulose has been broken down, nitrated or otherwise altered. In no case in which cellulose previously has been treated with $NO_2$ has a homogeneous, non-nitrated, completely alkali-soluble, undegraded cellulose been obtained.

One object of our invention is to prepare an undegraded cellulose which is completely alkali-soluble and which has not been nitrated. Another object of our invention is to provide a process for preparing an undegraded, non-nitrated cellulose by treating cellulose with $NO_2$ under the proper conditions.

We have found that, if cellulose is treated with gaseous $NO_2$ at a temperature, in the reaction vessel, of not more than approximately 20° C. using at least .6 part of $NO_2$ to every part of cellulose that oxidation occurs at the terminal carbon atoms of the glucose units of the cellulose forming carboxyl groups at these points. We have found that, by our treatment, a product may be obtained which exhibits a $CO_2$ equivalency of at least 13% and a complete solubility in aqueous sodium hydroxide of 2% concentration.

The time of treatment of the cellulose with gaseous $NO_2$ may be varied according to the ratio of $NO_2$ used to the cellulose being treated. In a process in which approximately .6 to .9 part of $NO_2$ is used to every part of cellulose, the time of treatment should ordinarily be at least 50 hours. In a process as carried out in the apparatus illustrated by Fig. I of the attached drawing, which will be alluded to, in which the oxide of nitrogen after its partial reduction is reoxidized to $NO_2$, a continuous supply of fresh $NO_2$ contacts the cellulose and a much shorter time, such as seven hours or less, would be sufficient to give a product having enough $CO_2$ equivalency to indicate complete alkali-solubility.

The attached drawing illustrates in section small scale apparatus, which may be employed to oxidize cellulose in accordance with our invention. The apparatus of Figure I is composed of a large flask E connected to smaller flask F by means of delivery tube A and return tube B. Return tube B is equipped with an air intake C. Small flask F is provided with a jacketed tube D to equalize the pressure.

The apparatus of Figure II is composed of a round bottom flask G equipped with a side arm J. Attached to the side arm is a small bell-shaped funnel K with a stopcock L. Near the lowest point on the side arm, a tube M, provided with a stopcock N, is attached. The process may be carried out in the apparatus of Fig. I of the drawing as follows:

The cellulose material, such as cotton, is well shredded and fluffed and placed in the large flask E which, during the course of the reaction, is preferably agitated either by hand or by a mechanical device. It is desirable to provide this flask with a thermometer extending therein sufficiently to register its internal temperature, thus permitting accurate control of the process. It is also desirable to provide some cooling means to prevent too great a rise in temperature during the reaction, as the internal temperature should not rise above approximately 20° C. In the apparatus shown, this may be a cloth surrounding the flask E, which is kept moist either by capillary action or by dropping water thereon. A quantity of liquid $NO_2$, preferably freshly distilled, is placed in the small flask F together with a quantity of phosphorus pentoxide to absorb moisture as it is formed in the course of the reaction. In carrying out the process, flask F is gently warmed so that the liquid boils slowly, the gaseous $NO_2$ moving down the delivery tube A and entering the bottom of the large flask. The large flask fills with the $NO_2$ gas and oxidation of the cellulose occurs. During the course of the reaction, water vapor and a lower oxide of nitrogen, such as nitric oxide (NO or $N_2O_3$) form, and are displaced upward leaving the flask E by means of tube B. Thus, a continuous current of gaseous $NO_2$ is passed thru the flask containing the cellulose.

When the reaction is carried out under cool temperature conditions, the cooling imparted to the flask by the surrounding cool air may be sufficient to prevent the temperature within the flask E rising appreciably above 20° C. In warm weather, or in a warmed room where there would be danger of the temperature rising appreciably above 20° C., promoted by the heat from the reaction, mild cooling of the flask is necessary.

The water vapor and lower oxide of nitrogen which are pushed from the large flask thru tube B are mixed with air which is introduced into the system at C, this air serving to reconvert the lower oxide to $NO_2$ and to promote the circulation of the gases thru the system. The $NO_2$ thus formed returns to the small flask F. The condenser D prevents the escape of $NO_2$ but allows the release of difficultly condensible gases present, such as the nitrogen and unused oxygen from the air introduced.

The apparatus illustrated is adapted for small scale operations. In carrying out the process on a large scale, the same general combination of apparatus is suitable except that non-corrodible alloy steel rather than glass is preferably employed. It is to be understood that the invention is not limited by the apparatus employed.

If desired, the process may be carried out at an elevated pressure, such as in an autoclave. The autoclave may be evacuated and either the gaseous $NO_2$ may be forced therein to give a superatmospheric pressure, or the $NO_2$ may be present in liquid form apart from the cellulose and, by heating, the $NO_2$ may be vaporized therein, the degree of heating determining the degree of pressure in the vessel. In this type of process, in which the $NO_2$ which is deprived of its oxygen is not re-oxidized, it is desirable that at least 0.6 part of $NO_2$ be present for each part of cellulose, to obtain a product having a $CO_2$ equivalency of at least 13%. It is also desirable in this case that the treatment be continued for 50 hours or more under ordinary conditions.

The following are examples of preparing oxidized cellulose in which the spent $NO_2$ was not re-oxidized. These examples were carried out in the apparatus illustrated by Fig. II of the drawing. The cellulose was placed in flask G, which was stoppered by a rubber stopper H containing a large test tube J, to which was sealed a stopcock L, carrying a funnel K. A tube M provided with stopcock N was also sealed into the test tube J to provide a means for evacuating the apparatus, such as by attaching tube M to a water pump, or some other type of evacuating pump. After evacuating the apparatus, the desired amount of liquid $NO_2$ was placed in the funnel K and, by means of the stopcock L, was allowed to flow into the test tube J. Stopcock L was then closed and the liquid $NO_2$ vaporized into the flask. If it is planned to heat the $NO_2$, the apparatus used must be such as will withstand the pressure generated thereby. The results obtained in several examples, in accordance with this procedure, using a time of 50–65 hours and an internal temperature of about 20° C. were as follows:

| Ratio of $NO_2$ to cellulose | $CO_2$ equivalency of the product |
|---|---|
| .9 | 15.84 |
| 1.2 | 19.8 |
| 1.5 | 21.8 |
| .75 | 13.38 |
| .6 | 13.26 |

The following examples were carried out in an apparatus as illustrated by Figure I of the drawing:

*Example I*

50 gms. of long fiber staple cotton were placed in the reaction chamber and subjected to a stream of gaseous $NO_2$ for seven hours, with an internal temperature not exceeding 20° C. The excess oxidizing gas was blown out and the cellulose material was washed with distilled water until the oxide of nitrogen was completely removed. The product was then air dried at room temperature. The product was completely soluble in a 2% sodium hydroxide solution and had a $CO_2$ equivalency of 16.3%.

*Example II*

50 gms. of cotton were placed in the reaction chamber subjected to a slow stream of gaseous $NO_2$ for fifteen hours. The oxidized cotton was air blown to remove excess oxidizing agent, washed with distilled water until the wash water was acid free, and air dried at room temperature. The product was completely soluble in 2% sodium hydroxide solution and had a $CO_2$ equivalency of 20.1%.

*Example III*

150 gms. of cotton were placed in the reaction chamber and subjected to a slow stream of gaseous $NO_2$ for 64 hours. The oxidized cotton was air blown, washed and dried, as described in the previous example. The product was completely soluble in 2% sodium hydroxide and had a $CO_2$ equivalency of 23.5%.

*Example IV*

150 grams of finely divided alpha cellulose, derived from wood pulp, were placed in the reaction chamber and subjected to a slow stream of gaseous $NO_2$ for 21 hours. The product, after being air blown, washed and dried, as described in the previous examples, was found to have a $CO_2$ equivalency of 20.35% and a complete solubility in a 2% sodium hydroxide solution.

*Example V*

50 grams of cotton were placed in the reaction chamber E of an apparatus, as illustrated by Figure I of the drawing. Liquid $NO_2$ was placed in the vessel F and air was passed through the pipe C at the rate of 1½ liters per minute. The cotton was treated for 71 hours. It was then air blown, washed and dried, as described. The product exhibited a complete solubility in 2% sodium hydroxide solution and a $CO_2$ equivalency of 23.6%.

Instead of cotton cellulose, other cellulose materials such as refined bagasse, refined wood pulp having a high-alpha-cellulose content, particularly refined sulfite pulp, or regenerated cellulose may be treated in accordance with our invention.

The product resulting from treatment with gaseous $NO_2$ as described has the same physical appearance and condition as the original cellulose which is evidence that degradation has not occurred; for instance the lengths of cellulose fibers treated by our process are substantially the same as before treatment, in the absence of mechanical shortening of the fibers. In the product the terminal carbon atoms of the glucose units of the cellulose have been oxidized, so that carboxyl groups are present thereon. This is shown by its enhanced absorptive power for basic dyestuffs, the ability to liberate acids from salts, such as calcium acetate, and the ability to dissolve in aqueous pyridine and in aqueous alkali solutions. An anhydro-glucose unit, in which the primary hydroxyl is oxidized to carboxyl, as here, is a combined uronic acid. Our oxidized cellulose, when boiled with acids, such as hydrochloric acid, forms carbon dioxide which is characteristic of a uronic acid. The method of analysis used for obtaining carbon dioxide equivalence values is based on the ability of uronic acids to liberate $CO_2$ with mineral acids. This method is as follows:

An accurately weighed sample of the oxidized cellulose (about 1 gr.), which has been dried in a vacuum desiccator, is placed in a suitable distillation outfit and treated with 30 cc. of a 12% aqueous solution of hydrochloric acid. The hydrochloric acid is previously boiled to eliminate carbon dioxide. The acid solution is heated to boiling and a stream of carbon dioxide-free air is slowly drawn over the solution. The air and accompanying $CO_2$ is dried then passed through a tube containing a suitable absorption medium for the carbon dioxide, such as soda-lime. This process is continued until no more carbon dioxide is evolved. The time required usually is between eight to twelve hours. The absorption tube is weighed and, from this, the amount of carbon dioxide formed may be determined. The $CO_2$ equivalence of the sample is then calculated in terms of the percent by weight of $CO_2$ formed by this treatment.

The modified celluloses, in which terminal carbon atoms of the glucose units of the cellulose are transformed to carboxyl groups, are adapted for use commercially.

For instance transparent films or sheets may be prepared from the oxidized cellulose by dissolving in an aqueous solution of a base such as alkali metal hydrate, ammonia, pyridine or triethanolamine and coating out the viscous liquid in the form of a film and drying. The water-soluble film, thus formed, may be rendered water-insoluble by immersing in aqueous acid and drying. A colorless, transparent and somewhat brittle sheet results. If a plasticizing agent, such as glycerine, is incorporated in the solution of cellulose before the formation of the film or sheet, a flexible product is obtained.

These oxidized celluloses may be employed for anti-halation backings for photographic film, which may be removed by the alkaline solution employed when it is developed.

When the terms "$NO_2$" or "nitrogen dioxide" are used herein they are to be understood as including both $NO_2$ and its dimer $N_2O_4$ which is often associated with $NO_2$.

The salts of the oxidized cellulose, described herein, may be prepared by reacting thereon with an aqueous solution of a base or with the salt of a weak acid. For instance, the salts may be prepared by treating the oxidized cellulose with a slight excess of aqueous pyridine, aqueous sodium hydroxide or aqueous ammonia. Upon allowing the mixture to stand, the salt is formed therein. In the case of pyridine, it may be necessary in some cases to warm the mixture to 50–60° C. The solution is likely to become a little yellow, but this coloration is removed by the addition of a little acetic acid to neutralize the excess base. After its formation, the salt may be separated from its solution by pouring into a water-miscible, non-solvent, such as alcohol or acetone, and subsequently washing the salt with alcohol or acetone and drying. The salt can be prepared by reacting with a salt of a weak acid, such as sodium acetate or sodium carbonate, upon the oxidized material. If a completely oxidized cellulose is reacted with aqueous sodium hydroxide or a sodium salt of a weak acid, the resulting compound is sodium polyanhydroglucuronate.

These salts may be used as interlayers in stripping film, as backings for film, as overcoatings for various surfaces, or as sizing for textiles. These salts have the advantage that they may be applied from aqueous solution. Any of the alkali metal, ammonia, or substituted ammonia salts may be employed where a water-soluble salt of a cellulose derivative is suitable for use.

We claim:

1. The process of preparing an oxidized cellulose which comprises treating one part of cellulose, under non-nitrating conditions, with at least .6 part of gaseous $NO_2$ at a temperature conducive to the circulation of $NO_2$ through the cellulose which does not substantially exceed 20° C. until the cellulose is substantially completely alkali-soluble.

2. The process of preparing an oxidized cellulose which comprises continuously passing at least .6 part of gaseous $NO_2$ through one part of cellulose, under non-nitrating conditions, at a temperature conducive to the circulation of the $NO_2$ through the cellulose which temperature does not substantially exceed 20° C.

3. The process of preparing a cellulose salt which comprises treating one part of cellulose, under non-nitrating conditions, with at least .6 part of gaseous $NO_2$ at a temperature conducive to the circulation of $NO_2$ through the cellulose and subsequently treating the resulting product with an aqueous solution of a base.

4. Oxidized cellulose completely soluble in 2% sodium hydroxide solution and having a $CO_2$ equivalence of at least 13%.

5. The alkali metal salt of an oxidized cellulose completely soluble in 2% sodium hydroxide solution and having a $CO_2$ equivalence of at least 13%.

EDWARD C. YACKEL.
WILLIAM O. KENYON.